US009942255B1

(12) United States Patent (10) Patent No.: US 9,942,255 B1
MacDermed et al. (45) Date of Patent: Apr. 10, 2018

(54) METHOD AND SYSTEM FOR DETECTING ABUSIVE BEHAVIOR IN HOSTED SERVICES

(71) Applicant: Google Inc., Mountain View, CA (US)

(72) Inventors: Liam MacDermed, Berkeley, CA (US); Elie Bursztein, Mountain View, CA (US); Sean Gilpin, Mountain View, CA (US); Pierre Grinspan, Mountain View, CA (US); Xiaofeng Liu, Scarsdale, NY (US); Devasia Manuel, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/394,963

(22) Filed: Dec. 30, 2016

(51) Int. Cl.
*H04L 29/06* (2006.01)

(52) U.S. Cl.
CPC ...... *H04L 63/1425* (2013.01); *H04L 63/1466* (2013.01)

(58) Field of Classification Search
CPC ............ H04L 63/1425; H04L 63/1466; H04L 63/1408; H04L 63/1416; H04L 63/1433; H04L 63/1441; H04L 67/12; G06F 21/55; G06F 21/554; G06F 21/56; G06F 21/566
See application file for complete search history.

(56) References Cited

U.S. PATENT DOCUMENTS

| | | | | |
|---|---|---|---|---|
| 7,712,134 B1 * | 5/2010 | Nucci | ................... | H04L 63/145 713/172 |
| 9,037,976 B2 | 5/2015 | Parham et al. | | |
| 9,332,024 B1 * | 5/2016 | Gulko | ................. | H04L 63/1425 |
| 9,361,463 B2 * | 6/2016 | Ferragut | ............... | G06F 21/577 |
| 9,369,483 B2 * | 6/2016 | Risher | .................... | G06Q 10/10 |
| 2008/0282324 A1 * | 11/2008 | Hoal | ....................... | G06Q 30/02 726/3 |
| 2011/0320816 A1 * | 12/2011 | Yao | ........................ | G06F 21/316 713/171 |
| 2012/0278477 A1 * | 11/2012 | Terrell | ............... | H04L 41/5009 709/224 |

(Continued)

OTHER PUBLICATIONS

Fukuda et al., "A PCA analysis of daily unwanted traffic", 2010, 24th IEEE International Conference on Advanced Information Networking and Applications, pp. 377-384.*

(Continued)

*Primary Examiner* — Matthew Smithers

(74) *Attorney, Agent, or Firm* — Fox Rothschild LLP

(57) ABSTRACT

A hosted service monitoring system detects abuse of a hosted service by monitoring user actions over a period of time. The system will identify an entity, which is a subset of the user actions that share one or more features in common. The system will also identify feature statistics to measure how often the features are associated with the user actions in the entity. The system will project the feature statistics to a vector and use the vector to generate an anomaly score for the entity. The system will determine that the entity is associated with an automated initiator if it generates an anomaly score that exceeds a threshold. Upon determining that the entity that is associated with an automated initiator, the system will cause the hosted service to take an action that will block the automated initiator from accessing the hosted service.

70 Claims, 8 Drawing Sheets

(56) References Cited

U.S. PATENT DOCUMENTS

| | | | |
|---|---|---|---|
| 2015/0229662 A1* | 8/2015 | Hitt | H04L 63/1425 726/23 |
| 2015/0341376 A1* | 11/2015 | Nandy | H04L 63/1408 726/23 |
| 2016/0142435 A1* | 5/2016 | Bernstein | H04L 63/1441 726/23 |
| 2016/0156580 A1 | 6/2016 | Krka et al. | |
| 2017/0134414 A1* | 5/2017 | Bailey | H04L 63/1425 |
| 2017/0171235 A1* | 6/2017 | Mulchandani | H04L 63/1425 |
| 2017/0195354 A1* | 7/2017 | Kesin | H04L 63/1425 |
| 2017/0286671 A1* | 10/2017 | Chari | G06F 21/552 |

OTHER PUBLICATIONS

Agrawal et al., "Adaptive Anomaly Detection in Cloud using Robust and Scalable Principal Component Analysis", 2016, 15th International Symposium on Parallel and Distributed Computing, pp. 100-106.*

Duong et al., "A Model for Network Traffic Anomaly Detection", Jul. 2015, ICACT Transactions on Advanced Communications Technology (TACT) vol. 4, Issue 4, pp. 644-650.*

Novakov et al., "Studies in Applying PCA and Wavelet Algorithms for Network Traffic Anomaly Detection", 2013, IEEE 14th International Conference on High Performance Switching and Routing, pp. 185-190.*

Senecal, David, "Anomaly Scoring is a Better Way to Detect a Real Attack" The Akami Blog, Dec. 11, 2013, printed from https://blogs.akamai.com/2013112/anomaly-scoring-is-a-better-way-to-detect-a-real-attack.html on Dec. 19, 2016.

* cited by examiner

US 9,942,255 B1

METHOD AND SYSTEM FOR DETECTING ABUSIVE BEHAVIOR IN HOSTED SERVICES

BACKGROUND

Detecting abusive behavior in hosted services, such as actions initiated by bots, automated downloader programs, website scrapers, viruses, denial-of-service attackers is a significant problem. This document describes a new technology that is directed to detecting and stopping attacks and other abusive behavior by automated initiators against hosted services.

Many organizations provide services to a variety of users through a computer network such as the Internet or an intranet. Examples of such network-based services include electronic mail and other messaging services, cloud-hosted data file storage and management, document sharing and collaboration services, online calendars, mobile device applications, social networking applications, and online audio and/or video streaming services.

As the demand for hosted services increases, it becomes an increasingly challenging task for an organization to detect and prevent attempts to misuse hosted services. For example, an email service provider will typically not want users to use their hosted email service to send spam email or phishing messages. Social media websites may want to prevent third parties from automatically mining the sites for data, or from hijacking the sites with malicious posts. Video sharing sites may want to prevent third party bots from automatically viewing videos to falsely increase video view counts. Online gaming services may desire to prevent bots from seeking and obtaining resources that typically require an individual player's time using the service to obtain. Ticket selling system operators may seek to prevent bots from automatically purchasing a significant number of available tickets for an event before actual attendees can complete their purchase requests.

As third parties automate the process of spamming, hijacking, scraping or otherwise abusing online services, it becomes even more challenging to detect and stop that activity. The detection of abuse in hosted services is therefore a significant technical challenge for many organizations.

This document describes methods and systems that are directed to detecting abusive actions by automated initiators of hosted services so that the hosted services can prevent those actions from causing harm to the service and its genuine users.

SUMMARY

A hosted service monitoring system detects abuse of a hosted service by monitoring user actions over a period of time. The system will identify an entity, which is a subset of the user actions that share one or more features in common. The system will also identify feature statistics to measure how often the features are associated with the user actions in the entity. The system will project the feature statistics to a vector and use the vector to generate an anomaly score for the entity. The system will determine that the entity is associated with an automated initiator if it generates an anomaly score that exceeds a threshold. Upon determining that the entity is associated with an automated initiator, the system will cause the hosted service to take an action that will block the automated initiator from accessing the hosted service. In this way, the system will examine a set of events (e.g., all emails sent from an IP), extract features from each event (e.g. the size of the message), and generate a score that helps the system assess how organic the set of events appears to be.

In some embodiments, when projecting the feature statistics for the entity to the vector, the system may generate an embedding by converting the entity into a dense continuous vector and assigning a default value to any available feature statistic that is not included in the dense vector.

In some embodiments, the anomaly score may represent a measurement of an area of the vector having an actual density for one or more of the feature statistics that is not consistent with an organic distribution for the one or more feature statistics.

In some embodiments, when the system takes the action that will block the automated initiator from accessing the hosted service, the system may do one or more of the following: (i) cause the hosted service to block attempts to access the hosted service when received by a user identifier associated with the automated initiator; (ii) cause the hosted service to block attempts to access the hosted service when received by a user agent associated with the automated initiator; (iii) cause the hosted service to block attempts to access the hosted service when received by an originating IP address associated with the automated initiator; or (iv) generate and output a report that provides identifying information for the initiator.

In some embodiments, when using the vector to generate the anomaly score for the entity, the system may perform an unsupervised scoring process by accessing an unsupervised scoring model. The unsupervised scoring model will be one that has been trained using feature statistics associated with user actions of users that are not automated initiators and that includes, as an organic distribution, a density of a feature statistic associated with users that are not automated initiators. The system may compare the vector to the organic distribution to determine a measure of distance between the vector and the organic distribution, and it may use the measure of distance to determine the anomaly score. One or more elements of a system may train the unsupervised scoring model by applying principle component analysis (PCA) to the feature statistics for user actions of users that are not automated initiators to yield a set of PCA-projected feature statistics, and then estimating the organic distribution by removing outliers from the set of PCA-projected feature statistics.

In other embodiments, using the vector to generate the anomaly score for the entity comprises performing a supervised scoring process by accessing a supervised scoring model that has been trained using feature statistics from users who have been determined to be automated initiators. The supervised scoring model includes a set of events that are identified as potentially malicious. The system may then generate the anomaly score as a measure of how many feature statistics in the entity correspond to events that are identified as potentially malicious in the supervised scoring model.

In some embodiments, before generating the anomaly score, and when projecting the feature statistics for the entity to the vector, the system also may project feature statistics for one or more additional entities of a first level aggregation into one or more additional vectors, and it may use the one or more additional vectors as features to generate a second level aggregation. If so, then when generating the anomaly score, the system may use the second level aggregation as the vector that is used to generate the anomaly score.

In some embodiments, when or after projecting the feature statistics for the entity to the vector, the system may identify one or more additional entities that is associated with a different hosted service. The system also may project a plurality of feature statistics for one or more additional entities into the vector.

In another embodiment, a hosted service monitoring system may monitor user actions that are taken on a hosted service over a period of time. Each of the user actions is associated with one or more features. The system will identify an entity that comprises a subset of the user actions that share at least one of the features in common. The system will identify a set of feature statistics for the entity, in which each of the feature statistics is a measurement of how often one of the features is associated with the user actions in the entity. The system will generate an embedding by converting the entity into a dense continuous vector and assigning a default value to any available feature statistic that is not included in the dense continuous vector. The system will use the embedding to generate an anomaly score for the entity. The anomaly score represents a measurement of an area of the dense continuous vector having an actual density for one or more of the feature statistics that is not consistent with an organic distribution for the one or more feature statistics. If the anomaly score exceeds a threshold, the system will determine that the entity is associated with an automated initiator and cause the hosted service to take an action that will block users associated with the entity from accessing the hosted service. If the anomaly score does not exceed the threshold, the system may not take action to block users associated with the entity from accessing the hosted service.

Any or all of the actions listed above may be implemented by a hosted service monitoring system that includes a processor, a data storage facility, and programming instructions stored in the data storage facility. The programming instructions will be configured to cause the processor to monitor user actions that are taken on one or more hosted services over a period of time.

DETAILED DESCRIPTION

Figure 1:
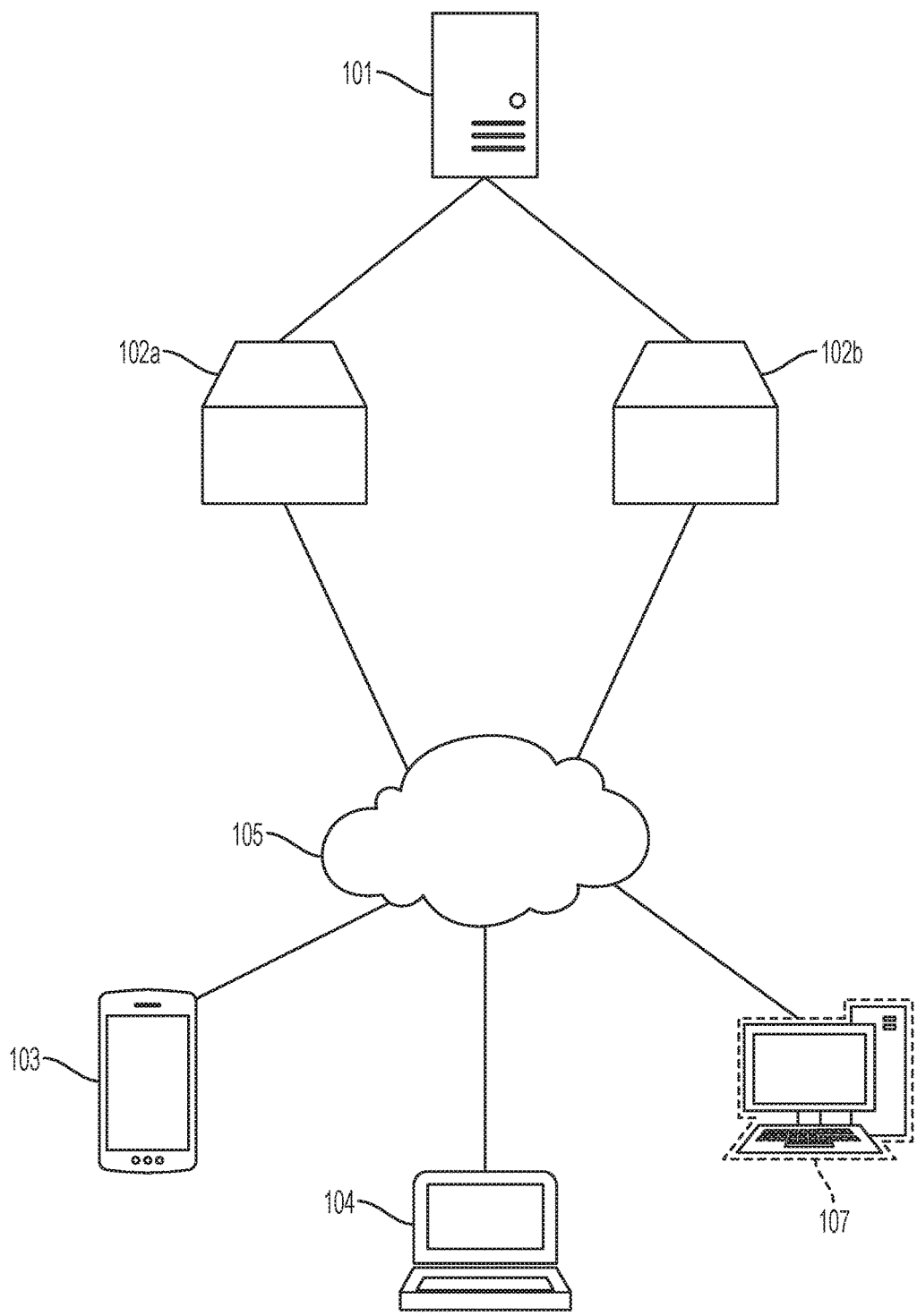
FIG. 1 illustrates an example of the various entities that make up a system including one or more hosted services, users, and a monitoring system.

Terminology that is relevant to this disclosure includes:

The singular forms "a," "an," and "the" include plural references unless the context clearly dictates otherwise. Also, the term "comprising" (or "comprise") means "including (or include), but not limited to." Unless defined otherwise, all technical and scientific terms used in this document have the same meanings as commonly understood by one of ordinary skill in the art.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

A "hosted service" refers to a system that includes one or more electronic devices that process data or execute programming applications for users or devices who access the service from one or more remote electronic devices via a communication network, such as the Internet. A hosted service may be provided in the form of software as a service, platform as a service, or infrastructure as a service. A hosted service may include servers and infrastructure elements (such as operating systems and communication systems) that are dedicated to each client, or it may provide services to multiple clients with shared servers and other resources. Examples of hosted services include web services, email services, other messaging services, cloud data storage services, multimedia content services, social media services and other types of hosted services.

A "user action" or "event" refers to an action taken by a user on a hosted service. Examples of user actions include sending electronic messages to other users or third parties via the hosted service, posting comments to content that is posted on the hosted service, viewing a video or listening to an audio stream that is made available by the hosted service, installing an application that is associated with the hosted service, purchasing a ticket to an event, or downloading content that is made available by the hosted service. The user may be a human who is accessing the hosted service via an electronic device, or the user may be an electronic device that is executing processing instructions to automatically use the hosted service. In this document, the user or device that takes the action may be referred to as an "initiator" of the user action, and the hosted service content or other user to which the action is directed may be referred to as a "subject" of the user action.

An "automated initiator" of a hosted service is a system of one or more electronic devices that takes a significantly (i.e., higher than a threshold) large number of user actions on the hosted service within a short (i.e., less than a threshold) period of time. An automated initiator may coordinate and implement an automated attack on a hosted service and thus may be malicious. Examples of automated initiators include spambots and other bots, botnets, automated downloader programs, website scrapers, viruses, denial-of-service attackers, and the like.

A "feature" is a measurable property of a user action. A feature may be stored in an event log field. Examples of features include an account age of the user, an Internet Protocol (IP) address from which the user action originated, a user agent, a text size, a user identifier (such as an email address, or a recognizable and transferrable user identifier), content on the hosted service to which the user action is directed (such as a particular video or audio file), or a timestamp.

An "entity" is a group of user actions that share one or more common features, such as a common initiator (as identified by, for example, a common user identifier, user agent, or originating IP address), a common subject (e.g., a particular video or audio file, a particular recipient of a message, particular content to which the user actions seek to post a comment, or another user to whom the user actions seek to direct a message), or timestamps that correspond to a common timestamp range. By grouping a set of user actions into an entity, the system described below can identify whether or not an entity is potentially malicious, so that future actions that are tied to the entity can be screened from or rejected by a hosted service.

A "feature statistic" is, for an entity, a statistic that represents a measurement of how often a particular feature is associated with the user actions that make up the entity. For example, a feature statistic may be a measurement (e.g., a percentage) of how many of the user actions are an email originating from a particular IP address. As another example, a feature statistic may be a ratio of the number of user actions that are an email originating from a particular IP address over the number user actions that are an email being sent to that IP address. Thus, a feature statistic can provide a measure of about the distribution of specific feature over user actions that are part of the same entity. In this document, the term "statistic" may be used to refer to a feature statistic.

An "embedding" is a dense continuous vector representing an entity. An "embedded space" is a set of embeddings for multiple entities. The distances between points in an embedded space can be used to assess the similarity between associated entities, with relatively lower distances representing more similarity and relatively higher distances representing less similarity between entities. Methods of creating embeddings and an embedded space will be described below.

A "series" is an ordered set of user actions. For example, a "time series" is a set of user actions that are ordered by time stamp, either in ascending or descending chronological order.

FIG. 1 illustrates various components of a system that will be discussed in this document. A hosted service monitoring system 101 is an electronic device that communicates with and monitors the operation of one or more hosted services 102a, 102b. The hosted services provide online applications, data storage or other services to any number of electronic device users 103, 104 via one or more communication networks 105 such as the Internet. As discussed below, one or more automated initiators 107 also may attempt to access the hosted services 102a, 102b. The monitoring system 101 will operate to identify such attempts by automated initiators using processes discussed below.

Figure 2:
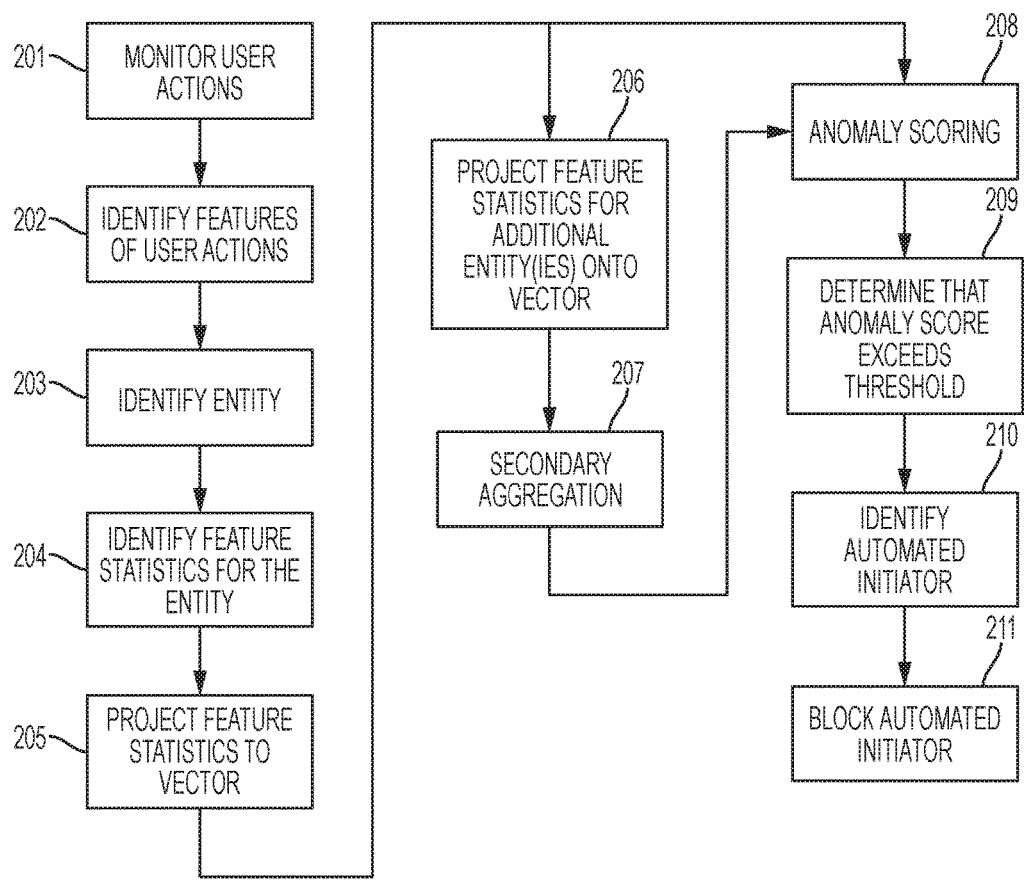
FIG. 2 is a flowchart that illustrates an example process of anomaly detection in hosted service monitoring.

FIG. 2 provides a high-level overview of a method of detecting abuse targeted toward one or more hosted services. In the method, a hosted service monitoring system may monitor 201 user actions, which are events that are taken or attempted by one or more users on a hosted service over a period of time. Examples of user actions include a hyperlink click, a video view, an application installation, or an electronic message transmission.

Each of the user actions is associated with one or more features, such as a user agent identifier, timestamp between the user action and a most recent user action from the same user, IP address, or other measurable characteristics of the action or its associated user. The hosted service monitoring system will identify the features of the user actions 202. The monitoring system may do this in real time by intercepting and monitoring the communications directed toward the hosted service, or (with reference to FIG. 3) by receiving them from a data set of activity logs of the hosted service 301 via an importing entity 302 and processing the features within the monitoring system 303. The features may be encoded as key-value pairs, where each key is a feature name, and each value is a type of the feature. Particular features may be repeated or missing. Some features may have default values, but missing features may be ignored with no key-value pair. The system may not determine statistics (discussed below) for any entity having more than a threshold level of missing features.

Optionally, any entity may have one or more additional fields. For example, an entity may have a "likely abuse", "potentially malicious" or similarly designated field that is set to "true" if the entity is known to be associated with potentially malicious activity. If the entity is not known to be associated with potentially malicious activity, the field may be left blank. If the entity is known with relative certainty to be non-malicious, this field may be marked "false," although for improved performance this option may not necessarily be used. An entity also may have a field designated as a "whitelist" (or a similar identifier) that will be set to "true" if the entity is known to be non-malicious, in which case the system may assign the entity as anomaly score of zero, or even not score it at all.

Returning to FIG. 2, the system will identify an entity 203, where the entity is a subset of the monitored user actions that share at least one of the features in common. The system may define the entity when it identifies at least a threshold number of user actions that share at least a threshold number of common features, or that share at least one or more common types of features or particular combinations of features in common. Alternatively, the entity may be pre-defined and imported from the client logs (301 of FIG. 3).

The monitoring system will identify a set of feature statistics for the entity 204. Each of the feature statistics is a measurement of how often one of the features is associated with the user actions in the entity over a period of time, such as occurrences per minute, occurrences per hour, occurrences per day or over a number of days within a defined time period during each day, or occurrences over a period of time in which monitoring occurred. At least some of the feature statistics will be unrelated to those features that all of the user actions in the entity share in common.

Figure 3:
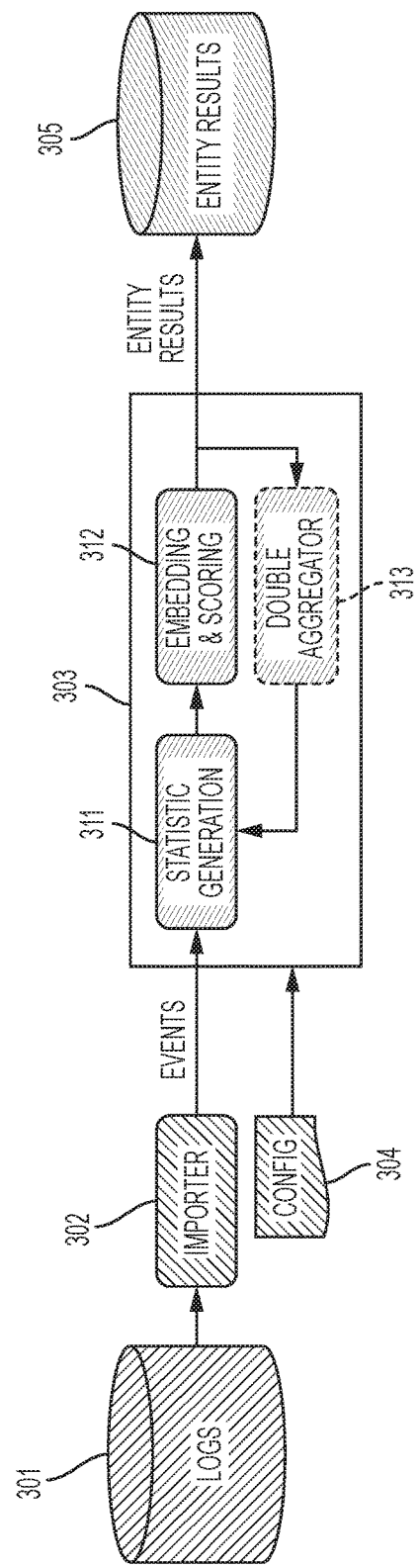
FIG. 3 is a block diagram of various elements of the monitoring system, along with its data inputs and outputs.

Referring to FIG. 3, the monitoring system 303 may define the feature statistics 311 based on one or more configuration parameters 304 that are input to the system by an administrator, by a command from a third party system, or from a configuration file. The configuration parameters may define the features, entities and/or scoring parameters that the monitoring system will use. Example features that may be included in the configuration parameters include categorical features, dense categorical features, binary features, numerical features and list features (i.e., features that may be included multiple times in a single user action). Additional examples of configuration statistics will be discussed below after FIG. 4. Also, as mentioned above, the system may not determine statistics for entities having more than a threshold number or percentage of missing features.

Once the system receives the configuration parameters and identifies the entity, it may identify the feature statistics (step 204 in FIG. 2) as a vector of either univariate feature statistics or time-series feature statistics. Univariate feature statistics are determined for a set of events without regard to their order, and are not affected by any other feature (hence the name univariate). Univariate feature statistics may be numeric (i.e., with standard types of statistics like mean and standard deviation) or categorical (i.e., with statistics based on a histogram of discrete values). Time-series feature statistics may be identified based on one or more configuration-based choices. The time-series feature statistics will be based on the timestamps associated with user actions, and the user actions within an entity can be filtered in various ways and a variable number of derivatives computed (all specified per time-series in the configuration parameters). Any feature statistic having a missing value may be assigned a default value.

Figure 4:
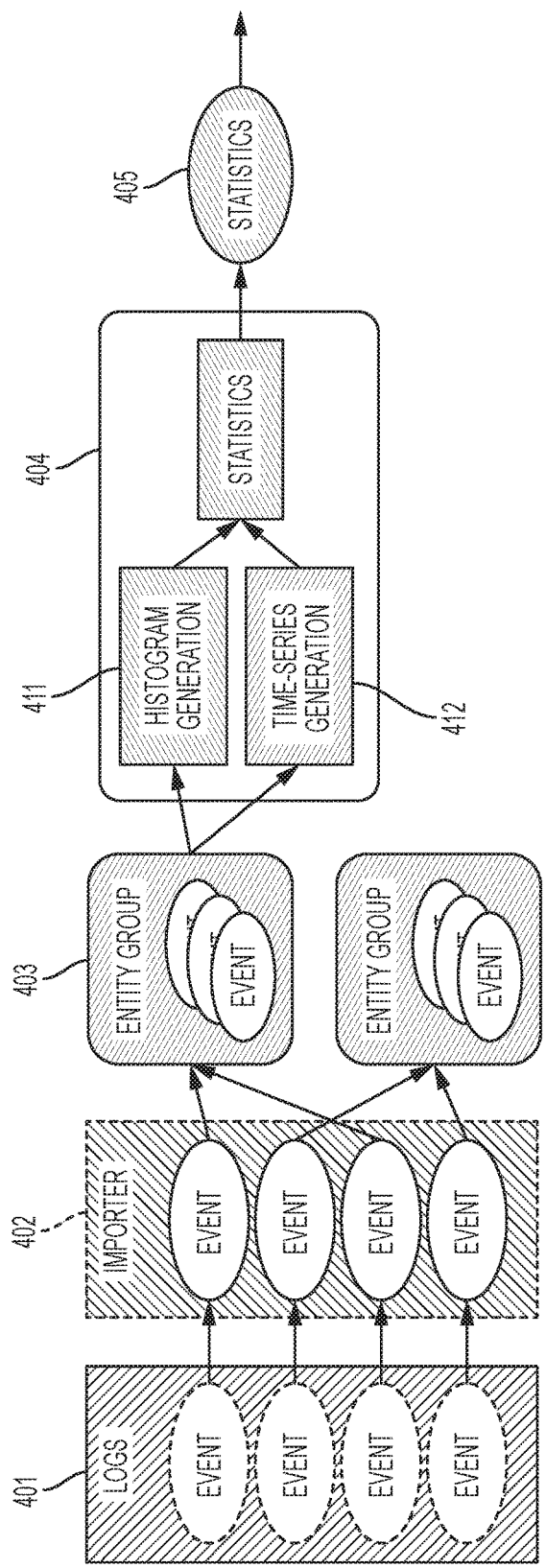
FIG. 4 illustrates an example process of generating feature statistics.

A process of generating feature statistics is shown in FIG. 4. The system may receive various events (user actions) from a data set 401 via an importer service and group the user actions by entity 403, such as by using their entity key as the identifier for actions that should be grouped. The system may determine the feature statistics 405 by processing them 404 through histogram generation 411 (for univariate feature statistics) and/or time-series generation 412 (for time-series feature statistics). Optionally, the system may impose a cap on the number of feature statistics determined for an entity. In addition, if there are less than a threshold level of samples of a feature statistic in an entity, the system may ignore that feature statistic. During scoring (discussed below), any feature statistic skipped in this way may be replaced with a default value. The determined feature statistics are then used by the system for scoring and embedding (discussed below).

The system may determine univariate feature statistics by collecting values of various features into sets, and processing the sets one at a time to determine statistics as specified by the configuration parameters. Example feature statistics include binary feature statistics, such as: (1) binary features, i.e., a ratio or fraction of user actions having a value other than false or empty; (2) presence, i.e., a statistic of a fraction of events in an entity having a particular feature; (3) top, i.e., a statistic of a fraction of events having the most common feature in the entity; (4) entropy; and (4) uniqueness, i.e., a fraction of those features having a single occurrence in the entity. Measurements of average, standard deviation, skew and/or kurtosis may be used to determine any feature statistic. In the case of categorical features, the system may generate a histogram with each bucket being a discrete categorical value. The system may sort the buckets by counts (i.e., the number of user actions with the given value), and then determine the feature statistics based on the distribution of counts.

The system may determine time-series feature statistics by using a matcher to determine which events to include in a series. The matcher will filter events and return either a raw timestamp of the events or duration timings of the events. The timings and/or timestamps are then grouped into a numeric distribution, and their numeric feature statistics determined. The system also may determine deltas (derivatives) of the timings and/or timestamps and determine numeric feature statistics on the deltas.

Optionally, the system also may use sessions, each of which is a successive pair of user actions returned by a single matcher. Sessions may represent the active time of a user, ending with a log-out or time-out. Sessions serve at least two roles. The first is to construct statistics in the duration of sessions as well as the time between sessions. The second is to function to window the other time series, so that durations (and other derivatives) of those time-series do not cross session boundaries. For example, for a time-series that is based on the timestamp of user actions, the system may determine the deltas (derivatives) between actions, but not want to use the outliers that would result from deltas when the user is not online.

Figure 5:
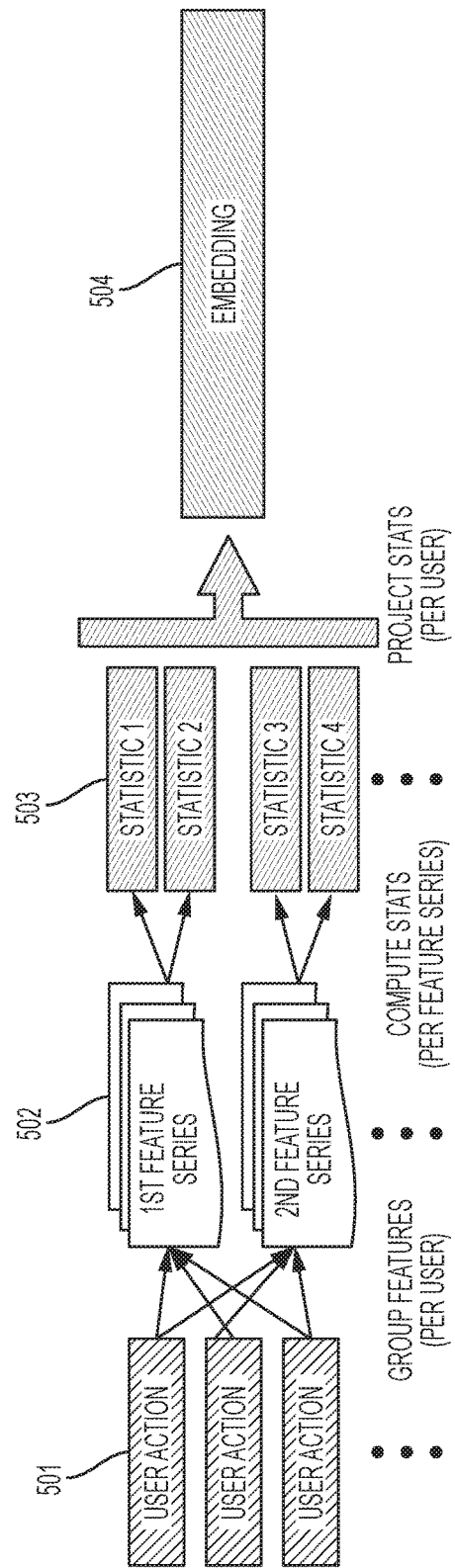
FIG. 5 illustrates an example process for generating an embedding.

Returning to FIG. 2, after the system determines the feature statistics 204 it may project those statistics to a lower-dimensional vector 205 (i.e., a vector having a lower dimension than a dimension of the original feature statistics vector). An example of this is shown in FIG. 5, showing user actions 501 grouped into entities (feature series) 502, from which feature statistics (metrics) 503 are determined and projected into metric space to form the embedding 504. Thus, each entity is converted into a dense vector in which any missing feature statistics are assigned a default value, and any entities that do not have at least a threshold level of feature statistics available are skipped.

Returning to FIG. 2, in some embodiments, when projecting the feature statistics for the entity into the embedding, the system may identify at least one additional entity that is associated with a different hosted service and project feature statistics for the additional entity(ies) into the vector 206. Alternatively, as will be discussed in more detail below, the system may also project feature statistics for one or more additional entities of a first level aggregation into an additional vector, and it may use the vectors as features to generate a second level aggregation 207. With these processes, the system may operate across multiple hosted services and/or detect secondary entities with unusually similar embeddings as the first level entities.

Figure 6:
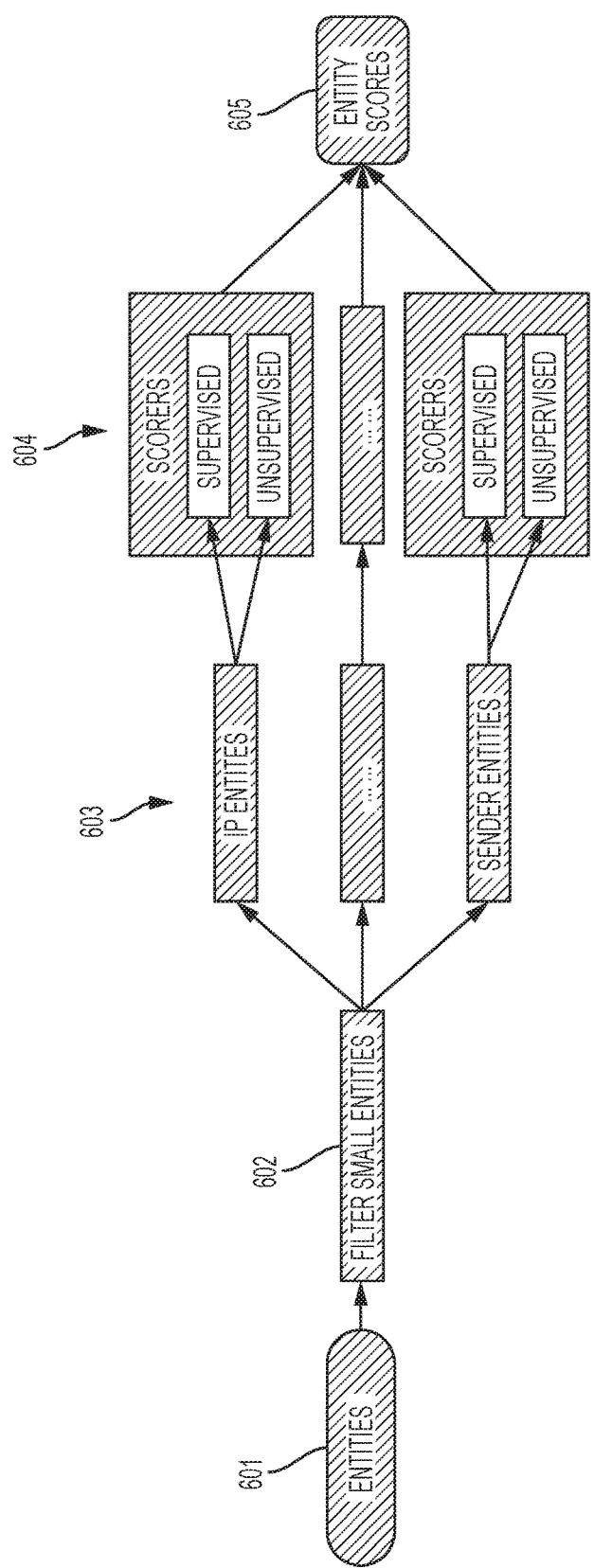
FIG. 6 illustrates an example scoring process.

Once the dense continuous vector (e.g., the embedding) is created, the system may use the vector to generate an anomaly score for the entity 208. Referring to FIG. 6, a set of entities 601 may be filtered 602 to eliminate any entities having less than a threshold number of user actions (e.g., IP addresses that have sent less than 30 messages). The remaining entities may be grouped into groups 603 based on entity type (e.g., sender identifier, IP address, etc.). Each entity and/or grouped 604 may be scored by unsupervised and supervised scoring methods to yield a score 605 for each entity.

For any given entity type, unsupervised scoring models the organic distributions of the entity feature statistics, and each entity is scored based on how different it is from the organic distribution. (The organic distribution is a set of feature statistics that are either typical or known to not be associated with an automated entity.) This is performed in a process that includes at least the following two steps. First, a scoring model is learned using all feature statistics of entities. Second, individual scores are computed for every entity using the trained scoring model.

The scoring model models the organic distributions of the feature statistics for normal users. It also may be learned in at least two steps. First, the system will remove linear correlations in the feature statistics and reduce redundant information using principle component analysis (PCA). This step centers the data (subtracts the mean) and rotates the data in order to maximize variance along the top axis. Dimensions with very low (i.e., less than a threshold level of) variance are discarded.

The second step of the scorer is to estimate the organic (normal user) distribution from the PCA-projected feature statistics. It is based on the observation that organic entities (e.g., legitimate messages in an email service) are usually similar and follow closely Gaussian distributions, while anomalous entities (e.g., spam email messages) are usually very heterogeneous and are outliers to organic entity distributions. For this the system may use a Minimum Covariance Determinant (MCD) estimator. MCD removes outliers by finding a subset of the samples such that the determinant of covariance matrix is minimized. Or in other words, it removes a user-defined ratio of data as outliers to find the most compact Gaussian distribution from a given dataset.

After a scoring model is learned, the system may determine an anomaly score for any given entity by comparing its feature statistic vector to the estimated organic distribution. In an embodiment, the score may be the mahalanobis distance of the entity to the organic distribution, based on the optimized covariance matrix computed by MCD.

Supervised scoring can be used for applications where labels are available, e.g., mail service data. The entity may be labeled as anomalous if the events it contains are mostly anomalous/spammy. These labeled entities may then be used to train a supervised regression model to compute the anomaly scores. Example models include a random Fourier feature map-(RFFM) based method and a logistic regression method.

Optionally, PCA can be performed on the data before training any of the scoring models discussed above After the scoring occurs, the system may produce a results set for each entity. The results set may anomaly scores, along with the feature statistic values and embedding for the entity. The feature statistics may be stored in sparse format with the feature statistic keys identifying the associated feature statistic value with the same index. The number of samples for each feature statistic also may be included on the results set. This corresponds to the number of features used to compute the feature statistic, which could be either more (in the case of repeated features) or less (in the case of sparse features) than the number of events. Feature statistics with less than a threshold number of samples may be omitted from the results set.

Returning to FIG. 2, upon generating an anomaly score that exceeds a threshold 209, the system may determine that the entity for whom the score was generated is associated with an automated initiator 210. Upon determining that the entity is associated with an automated initiator, the monitoring service may cause the hosted service to take an action that will block the automated initiator from accessing the hosted service 211, such as by causing a firewall to block all requests from an IP address of that entity. In addition or alternatively, the system may generate and output a report that identifies the automated initiator, either by identity or by characteristics (or both).

Figure 7:
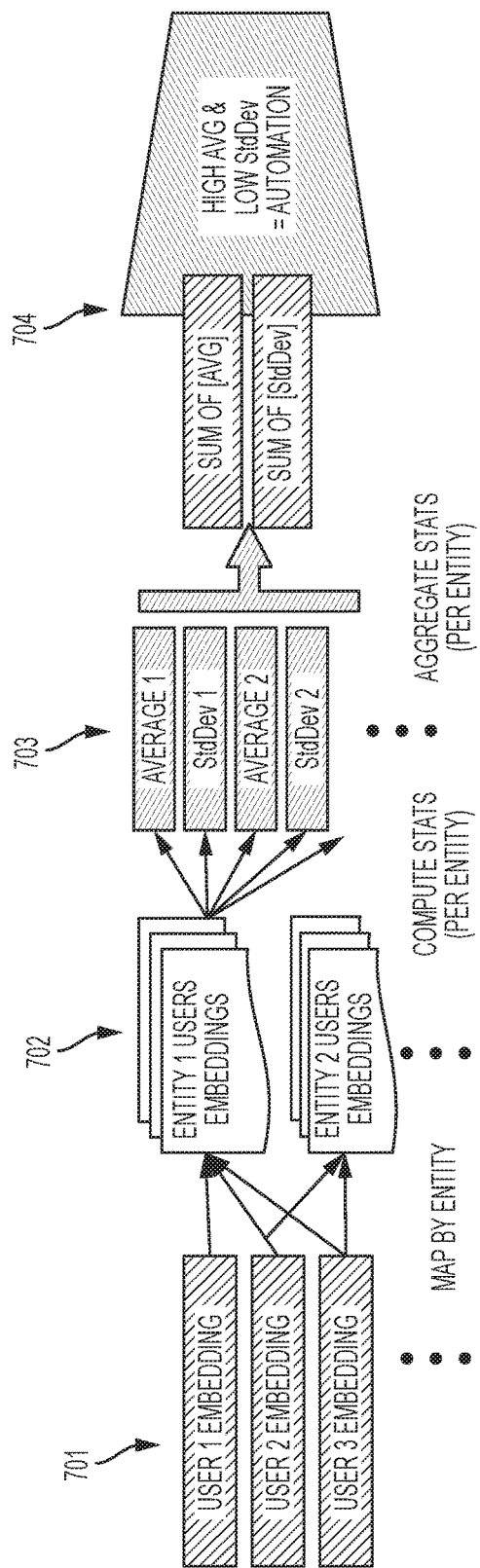
FIG. 7 illustrates an example process of developing a second level aggregation.

Optionally, as discussed above, before scoring the system may perform double aggregation to identify secondary entities that have vectors which are very similar to those of first level entities. Referring to FIG. 7, a second level aggregation will use the vectors (embeddings) of a first level aggregation 701 as features 702 for a second aggregation 704. Each dimension 703 is treated separately as its own numeric feature. No other features need be included in the second level aggregation beyond the first level entities' vectors. The system may generate anomaly scores for any or all of the secondary entities using any suitable scoring process. For example, the system may identify measurement of similarity (such as a distance between vectors) between the first level entities that make up the second level entity, and use the measurement as an anomaly score.

In some embodiments, when generating anomaly scores for the first level entities (see step 208 in FIG. 2 and the process of FIG. 6), the system may do so after performing the second level aggregation. If so, then the anomaly score for each first level entity in a second level aggregation may also be a function of the anomaly score for the second level aggregation (or aggregations) of which it is a part. The function may be to apply the second level aggregation's score (or a value based on the score) as a scaling factor, or some other function. In this way, a first level entity that is part of multiple highly scored secondary entities will also receive a relatively high score (i.e., as compared to the score it would have received if associated with only a single highly scored entity).

Figure 8:
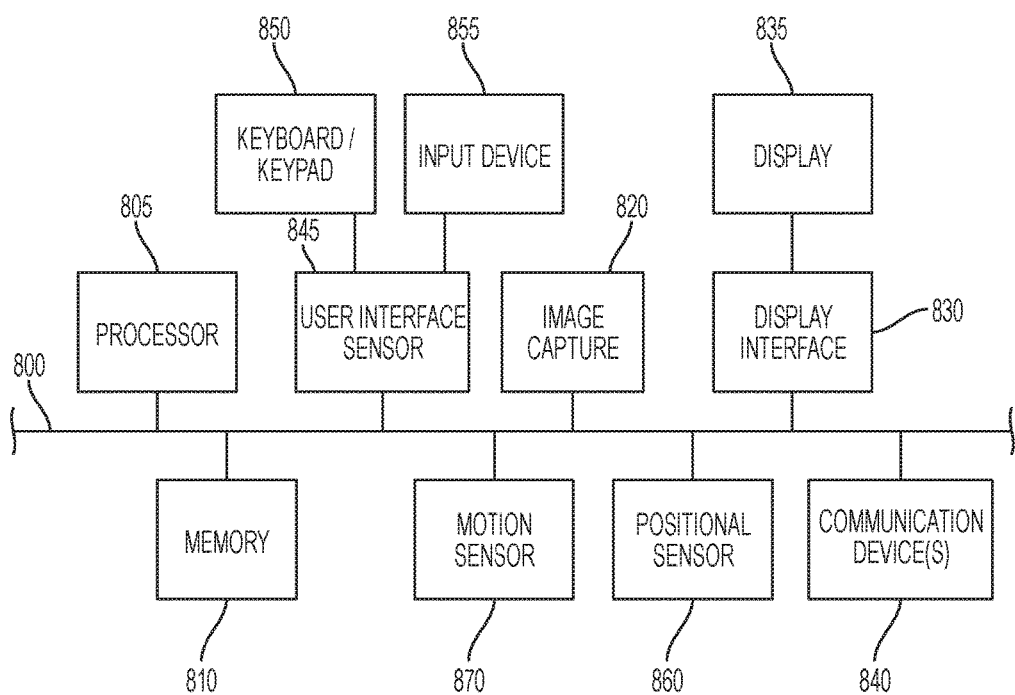
FIG. 8 is a block diagram showing example hardware components that may be included in various devices of the system, such as in a user electronic device, a monitoring system, a hosted service or an automated initiator.

FIG. 8 depicts a block diagram of hardware that may be used to contain or implement program instructions, such as those of a hosted service, a monitoring service for a hosted service, an electronic device that is accessing a hosted service, or a virtual machine or container that serves in any of these roles. A bus 800 serves as an information highway interconnecting the other illustrated components of the hardware. The bus may be a physical connection between elements of the system, or a wired or wireless communication system via which various elements of the system share data. Processor 805 is a processing device of the system performing calculations and logic operations required to execute a program. Processor 805, alone or in conjunction with one or more of the other elements disclosed in FIG. 8, is an example of a processing device, computing device or processor as such terms are used within this disclosure. The processing device may be a physical processing device, a virtual device contained within another processing device, or a container included within a processing device.

A memory device 810 is a hardware element or segment of a hardware element on which programming instructions, data, or both may be stored. Read only memory (ROM) and random access memory (RAM) constitute examples of memory devices, along with cloud storage services.

An optional display interface 830 may permit information to be displayed on the display 835 in audio, visual, graphic or alphanumeric format. Communication with external devices, such as a printing device, may occur using various communication devices 840, such as a communication port or antenna. A communication device 840 may be communicatively connected to a communication network, such as the Internet or an intranet.

The hardware may also include a user input interface 845 which allows for receipt of data from input devices such as a keyboard or keypad 850, or other input device 855 such as a mouse, a touchpad, a touch screen, a remote control, a pointing device, a video input device and/or a microphone. Data also may be received from an image capturing device 820 such as a digital camera or video camera. A positional sensor 860 and/or motion sensor 870 may be included to detect position and movement of the device. Examples of motion sensors 870 include gyroscopes or accelerometers. Examples of positional sensors 860 such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of detecting abuse of one or more hosted services, the method comprising:
by a hosted service monitoring system comprising a processor, executing programming instructions that cause the processor to:
monitor user actions that are taken on a hosted service over a period of time, wherein each of the user actions is associated with one or more features;
identify an entity that comprises a subset of the user actions that share at least one of the features in common;
identify a plurality of feature statistics for the entity, in which each of the feature statistics is a measurement of how often one of the features is associated with the user actions in the entity;
project the feature statistics for the entity to a vector, wherein projecting the feature statistics for the entity to the vector comprises generating an embedding by:
converting the entity into a dense continuous vector, and
assigning a default value to any available feature statistic that is not included in the dense continuous vector;
use the vector to generate an anomaly score for the entity;
upon generating an anomaly score that exceeds a threshold, determine that the entity is associated with an automated initiator; and
upon determining that the entity is associated with an automated initiator, cause the hosted service to take an action that will block the automated initiator from accessing the hosted service.

2. The method of claim 1, wherein the anomaly score represents a measurement of an area of the vector having an actual density for one or more of the feature statistics that is not consistent with an organic distribution for those one or more feature statistics.

3. The method of claim 1, wherein taking the action that will block the automated initiator from accessing the hosted service comprises one or more of the following:
causing the hosted service to block attempts to access the hosted service when received by a user identifier associated with the automated initiator;
causing the hosted service to block attempts to access the hosted service when received by a user agent associated with the automated initiator;
causing the hosted service to block attempts to access the hosted service when received by an originating IP address associated with the automated initiator; or
generating and outputting a report that provides identifying information for the initiator.

4. The method of claim 1, wherein using the vector to generate the anomaly score for the entity comprises performing an unsupervised scoring process by:
accessing an unsupervised scoring model that:
has been trained using feature statistics associated with user actions of users that are not automated initiators, and
includes, as an organic distribution, a density of a feature statistic associated with users that are not automated initiators;
comparing the vector to the organic distribution to determine a measure of distance between the vector and the organic distribution; and
using the measure of distance to determine the anomaly score.

5. The method of claim 4, further comprising, by a processor, training the unsupervised scoring model by:
applying principle component analysis (PCA) to the feature statistics for user actions of users that are not automated initiators to yield a set of PCA-projected feature statistics; and
estimating the organic distribution by removing outliers from the set of PCA-projected feature statistics.

6. The method of claim 1, wherein using the vector to generate the anomaly score for the entity comprises performing a supervised scoring process by:
accessing a supervised scoring model that has been trained using feature statistics from users who have been determined to be automated initiators, wherein the supervised scoring model comprises a set of events that are identified as potentially malicious; and
generating the anomaly score as a measure of how many feature statistics in the entity correspond to events that are identified as potentially malicious in the supervised scoring model.

7. The method of claim 1, further comprising, by the hosted service monitoring system:
before generating the anomaly score:
when projecting the feature statistics for the entity to the vector, also project a plurality of feature statistics for one or more additional entities of a first level aggregation to one or more additional vectors, and
use the vector and the one or more additional vectors as features to generate a second level aggregation; and
when generating the anomaly score, use the second level aggregation as the vector that is used to generate the anomaly score.

8. The method of claim 1, further comprising, when or after projecting the feature statistics for the entity to the vector:
identify at least one additional entity that is associated with a different hosted service; and
also project feature statistics for the at least one additional entity into the vector.

9. The method of claim 1, wherein at least some of the feature statistics are unrelated to the features that all of the user actions in the entity share in common.

10. The method of claim 1, wherein at least some of the feature statistics are unrelated to the features that all of the user actions in the entity share in common.

11. A hosted service monitoring system, comprising:
a processor;
a data storage facility; and
programming instructions stored in the data storage facility, wherein the programming instructions are configured to cause the processor to:
monitor user actions that are taken on a hosted service over a period of time, wherein each of the user actions is associated with one or more features,
identify an entity that comprises a subset of the user actions that share at least one of the features in common,
identify a plurality of feature statistics for the entity, in which each of the feature statistics is a measurement of how often one of the features is associated with the user actions in the entity,
project the feature statistics for the entity to a vector, wherein projecting the feature statistics for the entity to the vector comprises generating an embedding by:
converting the entity into a dense continuous vector; and
assigning a default value to any available feature statistic that is not included in the dense continuous vector,
use the vector to generate an anomaly score for the entity,
upon generating an anomaly score that exceeds a threshold, determine that the entity is associated with an automated initiator, and
upon determining that the entity is associated with an automated initiator, cause the hosted service to take an action that will block the automated initiator from accessing the hosted service.

12. The system of claim 11, wherein the programming instructions to generate the anomaly score comprise instructions to generate the anomaly score as a measurement of an area of the vector having an actual density for one or more of the feature statistics that is not consistent with an organic distribution for those one or more feature statistics.

13. The system of claim 11, wherein the programming instructions to take the action that will block the automated initiator from accessing the hosted service comprise instructions to do one or more of the following:
causing the hosted service to block attempts to access the hosted service when received by a user identifier associated with the automated initiator;
causing the hosted service to block attempts to access the hosted service when received by a user agent associated with the automated initiator;
causing the hosted service to block attempts to access the hosted service when received by an originating IP address associated with the automated initiator; or
generating and outputting a report that provides identifying information for the initiator.

14. The system of claim 11, wherein the programming instructions to use the vector to generate the anomaly score for the entity comprise instructions to perform an unsupervised scoring process by:
accessing an unsupervised scoring model that:
has been trained using feature statistics associated with user actions of users that are not automated initiators, and
includes, as an organic distribution, a density of a feature statistic associated with users that are not automated initiators;
comparing the vector to the organic distribution to determine a measure of distance between the vector and the organic distribution; and
using the measure of distance to determine the anomaly score.

15. The system of claim 14, further comprising additional programming instructions that are configured to cause a processor to train the unsupervised scoring model by:
applying principle component analysis (PCA) to the feature statistics for user actions of users that are not automated initiators to yield a set of PCA-projected feature statistics; and
estimating the organic distribution by removing outliers from the set of PCA-projected feature statistics.

16. The system of claim 11, wherein the programming instructions to use the vector to generate the anomaly score for the entity comprise instructions to perform a supervised scoring process by:
accessing a supervised scoring model that has been trained using feature statistics from users who have been determined to be automated initiators, wherein the supervised scoring model comprises a set of events that are identified as potentially malicious; and
generating the anomaly score as a measure of how many feature statistics in the entity correspond to events that are identified as potentially malicious in the supervised scoring model.

17. The system of claim 11, further comprising additional programming instructions that are configured to cause the processor to:
before generating the anomaly score:
when projecting the feature statistics for the entity to the vector, also projecting a plurality of feature statistics for one or more additional entities of a first level aggregation into one or more additional vectors, and
use the vector and the one or more additional vectors as features to generate a second level aggregation; and
when generating the anomaly score, use the second level aggregation as the vector that is used to generate the anomaly score.

18. The system of claim 11, further comprising additional programming instructions that are configured to cause the processor to, when or after projecting the feature statistics for the entity to the vector:
identify at least one additional entity that is associated with a different hosted service; and
also project feature statistics for the at least one additional entity into the vector.

19. The system of claim 11, wherein the programming instructions to use the vector to generate the anomaly score for the entity comprise instructions to perform an unsupervised scoring process by:
accessing an unsupervised scoring model that:
has been trained using feature statistics associated with user actions of users that are not automated initiators, and
includes, as an organic distribution, a density of a feature statistic associated with users that are not automated initiators;
comparing the vector to the organic distribution to determine a measure of distance between the vector and the organic distribution; and using the measure of distance to determine the anomaly score.

20. The system of claim 19, further comprising additional programming instructions that are configured to cause a processor to train the unsupervised scoring model by:
applying principle component analysis (PCA) to the feature statistics for user actions of users that are not automated initiators to yield a set of PCA-projected feature statistics; and
estimating the organic distribution by removing outliers from the set of PCA-projected feature statistics.

21. A hosted service monitoring system, comprising:
a processor;
a data storage facility; and
programming instructions stored in the data storage facility, wherein the programming instructions are configured to cause the processor to:
monitor user actions that are taken on a hosted service over a period of time, wherein each of the user actions is associated with one or more features,
identify an entity that comprises a subset of the user actions that share at least one of the features in common,
identify a plurality of feature statistics for the entity, in which each of the feature statistics is a measurement of how often one of the features is associated with the user actions in the entity,
generate an embedding by:
converting the entity into a dense continuous vector; and
assigning a default value to any available feature statistic that is not included in the dense continuous vector,
use the dense continuous vector to generate an anomaly score for the entity, wherein the anomaly score represents a measurement of an area of the dense continuous vector having an actual density for one or more of the feature statistics that is not consistent with an organic distribution for the one or more feature statistics,
if the anomaly score that exceeds a threshold, determine that the entity is associated with an automated initiator and cause the hosted service to take an action that will block users associated with the entity from accessing the hosted service, otherwise not take action to block users associated with the entity from accessing the hosted service.

22. A method of detecting abuse of one or more hosted services, the method comprising:
by a hosted service monitoring system comprising a processor, executing programming instructions that cause the processor to:
monitor user actions that are taken on a hosted service over a period of time, wherein each of the user actions is associated with one or more features;
identify an entity that comprises a subset of the user actions that share at least one of the features in common;
identify a plurality of feature statistics for the entity, in which each of the feature statistics is a measurement of how often one of the features is associated with the user actions in the entity;
project the feature statistics for the entity to a vector;
use the vector to generate an anomaly score for the entity, wherein the anomaly score represents a measurement of an area of the vector having an actual density for one or more of the feature statistics that is not consistent with an organic distribution for those one or more feature statistics;
upon generating an anomaly score that exceeds a threshold, determine that the entity is associated with an automated initiator; and
upon determining that the entity is associated with an automated initiator, cause the hosted service to take an action that will block the automated initiator from accessing the hosted service.

23. The method of claim 22, wherein taking the action that will block the automated initiator from accessing the hosted service comprises one or more of the following:
causing the hosted service to block attempts to access the hosted service when received by a user identifier associated with the automated initiator;
causing the hosted service to block attempts to access the hosted service when received by a user agent associated with the automated initiator;
causing the hosted service to block attempts to access the hosted service when received by an originating IP address associated with the automated initiator; or
generating and outputting a report that provides identifying information for the initiator.

24. The method of claim 22, wherein using the vector to generate the anomaly score for the entity comprises performing an unsupervised scoring process by:
accessing an unsupervised scoring model that:
has been trained using feature statistics associated with user actions of users that are not automated initiators, and
includes, as an organic distribution, a density of a feature statistic associated with users that are not automated initiators;
comparing the vector to the organic distribution to determine a measure of distance between the vector and the organic distribution; and
using the measure of distance to determine the anomaly score.

25. The method of claim 24, further comprising, by a processor, training the unsupervised scoring model by:
applying principle component analysis (PCA) to the feature statistics for user actions of users that are not automated initiators to yield a set of PCA-projected feature statistics; and
estimating the organic distribution by removing outliers from the set of PCA-projected feature statistics.

26. The method of claim 22, wherein using the vector to generate the anomaly score for the entity comprises performing a supervised scoring process by:
accessing a supervised scoring model that has been trained using feature statistics from users who have been determined to be automated initiators, wherein the supervised scoring model comprises a set of events that are identified as potentially malicious; and
generating the anomaly score as a measure of how many feature statistics in the entity correspond to events that are identified as potentially malicious in the supervised scoring model.

27. The method of claim 22, further comprising, by the hosted service monitoring system:
before generating the anomaly score:
when projecting the feature statistics for the entity to the vector, also project a plurality of feature statistics for one or more additional entities of a first level aggregation to one or more additional vectors, and
use the vector and the one or more additional vectors as features to generate a second level aggregation; and when generating the anomaly score, use the second level aggregation as the vector that is used to generate the anomaly score.

28. The method of claim 22, further comprising, when or after projecting the feature statistics for the entity to the vector:
identify at least one additional entity that is associated with a different hosted service; and
also project feature statistics for the at least one additional entity into the vector.

29. The method of claim 22, wherein at least some of the feature statistics are unrelated to the features that all of the user actions in the entity share in common.

30. A method of detecting abuse of one or more hosted services, the method comprising:
by a hosted service monitoring system comprising a processor, executing programming instructions that cause the processor to:
monitor user actions that are taken on a hosted service over a period of time, wherein each of the user actions is associated with one or more features;
identify an entity that comprises a subset of the user actions that share at least one of the features in common;
identify a plurality of feature statistics for the entity, in which each of the feature statistics is a measurement of how often one of the features is associated with the user actions in the entity;
project the feature statistics for the entity to a vector;
use the vector to generate an anomaly score for the entity, wherein using the vector to generate the anomaly score for the entity comprises performing a supervised scoring process by:
accessing a supervised scoring model that has been trained using feature statistics from users who have been determined to be automated initiators, wherein the supervised scoring model comprises a set of events that are identified as potentially malicious, and
generating the anomaly score as a measure of how many feature statistics in the entity correspond to events that are identified as potentially malicious in the supervised scoring model;
upon generating an anomaly score that exceeds a threshold, determine that the entity is associated with an automated initiator; and
upon determining that the entity is associated with an automated initiator, cause the hosted service to take an action that will block the automated initiator from accessing the hosted service.

31. The method of claim 30, wherein taking the action that will block the automated initiator from accessing the hosted service comprises one or more of the following:
causing the hosted service to block attempts to access the hosted service when received by a user identifier associated with the automated initiator;
causing the hosted service to block attempts to access the hosted service when received by a user agent associated with the automated initiator;
causing the hosted service to block attempts to access the hosted service when received by an originating IP address associated with the automated initiator; or
generating and outputting a report that provides identifying information for the initiator.

32. The method of claim 30, wherein using the vector to generate the anomaly score for the entity comprises performing an unsupervised scoring process by:
accessing an unsupervised scoring model that:
has been trained using feature statistics associated with user actions of users that are not automated initiators, and
includes, as an organic distribution, a density of a feature statistic associated with users that are not automated initiators;
comparing the vector to the organic distribution to determine a measure of distance between the vector and the organic distribution; and
using the measure of distance to determine the anomaly score.

33. The method of claim 32, further comprising, by a processor, training the unsupervised scoring model by:
applying principle component analysis (PCA) to the feature statistics for user actions of users that are not automated initiators to yield a set of PCA-projected feature statistics; and
estimating the organic distribution by removing outliers from the set of PCA-projected feature statistics.

34. The method of claim 30, further comprising, by the hosted service monitoring system:
before generating the anomaly score:
when projecting the feature statistics for the entity to the vector, also project a plurality of feature statistics for one or more additional entities of a first level aggregation to one or more additional vectors, and
use the vector and the one or more additional vectors as features to generate a second level aggregation; and
when generating the anomaly score, use the second level aggregation as the vector that is used to generate the anomaly score.

35. The method of claim 30, further comprising, when or after projecting the feature statistics for the entity to the vector:
identify at least one additional entity that is associated with a different hosted service; and
also project feature statistics for the at least one additional entity into the vector.

36. The method of claim 30, wherein at least some of the feature statistics are unrelated to the features that all of the user actions in the entity share in common.

37. A method of detecting abuse of one or more hosted services, the method comprising:
by a hosted service monitoring system comprising a processor, executing programming instructions that cause the processor to:
monitor user actions that are taken on a hosted service over a period of time, wherein each of the user actions is associated with one or more features;
identify an entity that comprises a subset of the user actions that share at least one of the features in common;
identify a plurality of feature statistics for the entity, in which each of the feature statistics is a measurement of how often one of the features is associated with the user actions in the entity;
project the feature statistics for the entity to a vector, and when projecting the feature statistics for the entity to the vector:
also project a plurality of feature statistics for one or more additional entities of a first level aggregation to one or more additional vectors, and
use the vector and the one or more additional vectors as features to generate a second level aggregation;
use the second level aggregation to generate an anomaly score for the entity;

upon generating an anomaly score that exceeds a threshold, determine that the entity is associated with an automated initiator; and upon determining that the entity is associated with an automated initiator, cause the hosted service to take an action that will block the automated initiator from accessing the hosted service.

38. The method of claim 37, wherein taking the action that will block the automated initiator from accessing the hosted service comprises one or more of the following:

causing the hosted service to block attempts to access the hosted service when received by a user identifier associated with the automated initiator;

causing the hosted service to block attempts to access the hosted service when received by a user agent associated with the automated initiator;

causing the hosted service to block attempts to access the hosted service when received by an originating IP address associated with the automated initiator; or generating and outputting a report that provides identifying information for the initiator.

39. The method of claim 37, wherein using the vector to generate the anomaly score for the entity comprises performing an unsupervised scoring process by:

accessing an unsupervised scoring model that:
has been trained using feature statistics associated with user actions of users that are not automated initiators, and
includes, as an organic distribution, a density of a feature statistic associated with users that are not automated initiators;

comparing the vector to the organic distribution to determine a measure of distance between the vector and the organic distribution; and using the measure of distance to determine the anomaly score.

40. The method of claim 39, further comprising, by a processor, training the unsupervised scoring model by:

applying principle component analysis (PCA) to the feature statistics for user actions of users that are not automated initiators to yield a set of PCA-projected feature statistics; and estimating the organic distribution by removing outliers from the set of PCA-projected feature statistics.

41. The method of claim 37, further comprising, when or after projecting the feature statistics for the entity to the vector:

identify at least one additional entity that is associated with a different hosted service; and also project feature statistics for the at least one additional entity into the vector.

42. The method of claim 37, wherein at least some of the feature statistics are unrelated to the features that all of the user actions in the entity share in common.

43. A method of detecting abuse of one or more hosted services, the method comprising:

by a hosted service monitoring system comprising a processor, executing programming instructions that cause the processor to:

monitor user actions that are taken on a hosted service over a period of time, wherein each of the user actions is associated with one or more features;

identify an entity that comprises a subset of the user actions that share at least one of the features in common;

identify a plurality of feature statistics for the entity, in which each of the feature statistics is a measurement of how often one of the features is associated with the user actions in the entity;

project the feature statistics for the entity to a vector, and when or after projecting the feature statistics for the entity to the vector:

identify at least one additional entity that is associated with a different hosted service, and also project feature statistics for the at least one additional entity into the vector;

use the vector to generate an anomaly score for the entity;

upon generating an anomaly score that exceeds a threshold, determine that the entity is associated with an automated initiator; and upon determining that the entity is associated with an automated initiator, cause the hosted service to take an action that will block the automated initiator from accessing the hosted service.

44. The method of claim 43, wherein taking the action that will block the automated initiator from accessing the hosted service comprises one or more of the following:

causing the hosted service to block attempts to access the hosted service when received by a user identifier associated with the automated initiator;

causing the hosted service to block attempts to access the hosted service when received by a user agent associated with the automated initiator;

causing the hosted service to block attempts to access the hosted service when received by an originating IP address associated with the automated initiator; or generating and outputting a report that provides identifying information for the initiator.

45. The method of claim 43, wherein using the vector to generate the anomaly score for the entity comprises performing an unsupervised scoring process by:

accessing an unsupervised scoring model that:
has been trained using feature statistics associated with user actions of users that are not automated initiators, and
includes, as an organic distribution, a density of a feature statistic associated with users that are not automated initiators;

comparing the vector to the organic distribution to determine a measure of distance between the vector and the organic distribution; and using the measure of distance to determine the anomaly score.

46. The method of claim 45, further comprising, by a processor, training the unsupervised scoring model by:

applying principle component analysis (PCA) to the feature statistics for user actions of users that are not automated initiators to yield a set of PCA-projected feature statistics; and estimating the organic distribution by removing outliers from the set of PCA-projected feature statistics.

47. A method of detecting abuse of one or more hosted services, the method comprising:

by a hosted service monitoring system comprising a processor, executing programming instructions that cause the processor to:

monitor user actions that are taken on a hosted service over a period of time, wherein each of the user actions is associated with one or more features;

identify an entity that comprises a subset of the user actions that share at least one of the features in common;

identify a plurality of feature statistics for the entity, in which each of the feature statistics is a measurement of how often one of the features is associated with the user actions in the entity, and wherein at least some of the feature statistics are unrelated to the features that all of the user actions in the entity share in common;
project the feature statistics for the entity to a vector;
use the vector to generate an anomaly score for the entity;
upon generating an anomaly score that exceeds a threshold, determine that the entity is associated with an automated initiator; and
upon determining that the entity is associated with an automated initiator, cause the hosted service to take an action that will block the automated initiator from accessing the hosted service.

48. The method of claim 47, wherein taking the action that will block the automated initiator from accessing the hosted service comprises one or more of the following:
causing the hosted service to block attempts to access the hosted service when received by a user identifier associated with the automated initiator;
causing the hosted service to block attempts to access the hosted service when received by a user agent associated with the automated initiator;
causing the hosted service to block attempts to access the hosted service when received by an originating IP address associated with the automated initiator; or
generating and outputting a report that provides identifying information for the initiator.

49. The method of claim 47, wherein using the vector to generate the anomaly score for the entity comprises performing an unsupervised scoring process by:
accessing an unsupervised scoring model that:
has been trained using feature statistics associated with user actions of users that are not automated initiators, and
includes, as an organic distribution, a density of a feature statistic associated with users that are not automated initiators;
comparing the vector to the organic distribution to determine a measure of distance between the vector and the organic distribution; and
using the measure of distance to determine the anomaly score.

50. The method of claim 49, further comprising, by a processor, training the unsupervised scoring model by:
applying principle component analysis (PCA) to the feature statistics for user actions of users that are not automated initiators to yield a set of PCA-projected feature statistics; and
estimating the organic distribution by removing outliers from the set of PCA-projected feature statistics.

51. A hosted service monitoring system, comprising:
a processor;
a data storage facility; and
programming instructions stored in the data storage facility, wherein the programming instructions are configured to cause the processor to:
monitor user actions that are taken on a hosted service over a period of time, wherein each of the user actions is associated with one or more features,
identify an entity that comprises a subset of the user actions that share at least one of the features in common,
identify a plurality of feature statistics for the entity, in which each of the feature statistics is a measurement of how often one of the features is associated with the user actions in the entity,
project the feature statistics for the entity to a vector,
use the vector to generate an anomaly score for the entity by generating the anomaly score, as a measurement of an area of the vector having an actual density for one or more of the feature statistics that is not consistent with an organic distribution for those one or more feature statistics,
upon generating an anomaly score that exceeds a threshold, determine that the entity is associated with an automated initiator, and
upon determining that the entity is associated with an automated initiator, cause the hosted service to take an action that will block the automated initiator from accessing the hosted service.

52. The system of claim 51, wherein the programming instructions to take the action that will block the automated initiator from accessing the hosted service comprise instructions to do one or more of the following:
causing the hosted service to block attempts to access the hosted service when received by a user identifier associated with the automated initiator;
causing the hosted service to block attempts to access the hosted service when received by a user agent associated with the automated initiator;
causing the hosted service to block attempts to access the hosted service when received by an originating IP address associated with the automated initiator; or
generating and outputting a report that provides identifying information for the initiator.

53. The system of claim 51, wherein the programming instructions to use the vector to generate the anomaly score for the entity comprise instructions to perform an unsupervised scoring process by:
accessing an unsupervised scoring model that:
has been trained using feature statistics associated with user actions of users that are not automated initiators, and
includes, as an organic distribution, a density of a feature statistic associated with users that are not automated initiators;
comparing the vector to the organic distribution to determine a measure of distance between the vector and the organic distribution; and
using the measure of distance to determine the anomaly score.

54. The system of claim 53, further comprising additional programming instructions that are configured to cause a processor to train the unsupervised scoring model by:
applying principle component analysis (PCA) to the feature statistics for user actions of users that are not automated initiators to yield a set of PCA-projected feature statistics; and
estimating the organic distribution by removing outliers from the set of PCA-projected feature statistics.

55. The system of claim 51, wherein the programming instructions to use the vector to generate the anomaly score for the entity comprise instructions to perform a supervised scoring process by:
accessing a supervised scoring model that has been trained using feature statistics from users who have been determined to be automated initiators, wherein the supervised scoring model comprises a set of events that are identified as potentially malicious; and generating the anomaly score as a measure of how many feature statistics in the entity correspond to events that are identified as potentially malicious in the supervised scoring model.

56. The system of claim 51, further comprising additional programming instructions that are configured to cause the processor to:
 before generating the anomaly score:
  when projecting the feature statistics for the entity to the vector, also projecting a plurality of feature statistics for one or more additional entities of a first level aggregation into one or more additional vectors, and
  use the vector and the one or more additional vectors as features to generate a second level aggregation; and
 when generating the anomaly score, use the second level aggregation as the vector that is used to generate the anomaly score.

57. The system of claim 51, further comprising additional programming instructions that are configured to cause the processor to, when or after projecting the feature statistics for the entity to the vector:
 identify at least one additional entity that is associated with a different hosted service; and
 also project feature statistics for the at least one additional entity into the vector.

58. A hosted service monitoring system, comprising:
 a processor;
 a data storage facility; and
 programming instructions stored in the data storage facility, wherein the programming instructions are configured to cause the processor to:
  monitor user actions that are taken on a hosted service over a period of time, wherein each of the user actions is associated with one or more features,
  identify an entity that comprises a subset of the user actions that share at least one of the features in common,
  identify a plurality of feature statistics for the entity, in which each of the feature statistics is a measurement of how often one of the features is associated with the user actions in the entity,
  project the feature statistics for the entity to a vector,
  use the vector to generate an anomaly score for the entity via a supervised scoring process by:
   accessing a supervised scoring model that has been trained using feature statistics from users who have been determined to be automated initiators, wherein the supervised scoring model comprises a set of events that are identified as potentially malicious, and
   generating the anomaly score as a measure of how many feature statistics in the entity correspond to events that are identified as potentially malicious in the supervised scoring model,
  upon generating an anomaly score that exceeds a threshold, determine that the entity is associated with an automated initiator, and
  upon determining that the entity is associated with an automated initiator, cause the hosted service to take an action that will block the automated initiator from accessing the hosted service.

59. The system of claim 58, wherein the programming instructions to take the action that will block the automated initiator from accessing the hosted service comprise instructions to do one or more of the following:
 causing the hosted service to block attempts to access the hosted service when received by a user identifier associated with the automated initiator;
 causing the hosted service to block attempts to access the hosted service when received by a user agent associated with the automated initiator;
 causing the hosted service to block attempts to access the hosted service when received by an originating IP address associated with the automated initiator; or
 generating and outputting a report that provides identifying information for the initiator.

60. The system of claim 58, wherein the programming instructions to use the vector to generate the anomaly score for the entity comprise instructions to perform an unsupervised scoring process by:
 accessing an unsupervised scoring model that:
  has been trained using feature statistics associated with user actions of users that are not automated initiators, and
  includes, as an organic distribution, a density of a feature statistic associated with users that are not automated initiators;
 comparing the vector to the organic distribution to determine a measure of distance between the vector and the organic distribution; and
 using the measure of distance to determine the anomaly score.

61. The system of claim 60, further comprising additional programming instructions that are configured to cause a processor to train the unsupervised scoring model by:
 applying principle component analysis (PCA) to the feature statistics for user actions of users that are not automated initiators to yield a set of PCA-projected feature statistics; and
 estimating the organic distribution by removing outliers from the set of PCA-projected feature statistics.

62. The system of claim 58, further comprising additional programming instructions that are configured to cause the processor to:
 before generating the anomaly score:
  when projecting the feature statistics for the entity to the vector, also projecting a plurality of feature statistics for one or more additional entities of a first level aggregation into one or more additional vectors, and
  use the vector and the one or more additional vectors as features to generate a second level aggregation; and
 when generating the anomaly score, use the second level aggregation as the vector that is used to generate the anomaly score.

63. The system of claim 58, further comprising additional programming instructions that are configured to cause the processor to, when or after projecting the feature statistics for the entity to the vector:
 identify at least one additional entity that is associated with a different hosted service; and
 also project feature statistics for the at least one additional entity into the vector.

64. A hosted service monitoring system, comprising:
 a processor;
 a data storage facility; and
 programming instructions stored in the data storage facility, wherein the programming instructions are configured to cause the processor to:
  monitor user actions that are taken on a hosted service over a period of time, wherein each of the user actions is associated with one or more features, identify an entity that comprises a subset of the user actions that share at least one of the features in common, identify a plurality of feature statistics for the entity, in which each of the feature statistics is a measurement of how often one of the features is associated with the user actions in the entity, project the feature statistics for the entity to a vector, project a plurality of feature statistics for one or more additional entities of a first level aggregation into one or more additional vectors, use the vector and the one or more additional vectors as features to generate a second level aggregation, use the second level aggregation to generate an anomaly score for the entity, upon generating an anomaly score that exceeds a threshold, determine that the entity is associated with an automated initiator, and upon determining that the entity is associated with an automated initiator, cause the hosted service to take an action that will block the automated initiator from accessing the hosted service.

65. The system of claim 64, wherein the programming instructions to take the action that will block the automated initiator from accessing the hosted service comprise instructions to do one or more of the following:

causing the hosted service to block attempts to access the hosted service when received by a user identifier associated with the automated initiator;

causing the hosted service to block attempts to access the hosted service when received by a user agent associated with the automated initiator;

causing the hosted service to block attempts to access the hosted service when received by an originating IP address associated with the automated initiator; or generating and outputting a report that provides identifying information for the initiator.

66. The system of claim 64, wherein the programming instructions to use the vector to generate the anomaly score for the entity comprise instructions to perform an unsupervised scoring process by:

accessing an unsupervised scoring model that:
has been trained using feature statistics associated with user actions of users that are not automated initiators, and includes, as an organic distribution, a density of a feature statistic associated with users that are not automated initiators;

comparing the vector to the organic distribution to determine a measure of distance between the vector and the organic distribution; and using the measure of distance to determine the anomaly score.

67. The system of claim 66, further comprising additional programming instructions that are configured to cause a processor to train the unsupervised scoring model by:

applying principle component analysis (PCA) to the feature statistics for user actions of users that are not automated initiators to yield a set of PCA-projected feature statistics; and estimating the organic distribution by removing outliers from the set of PCA-projected feature statistics.

68. The system of claim 64, further comprising additional programming instructions that are configured to cause the processor to, when or after projecting the feature statistics for the entity to the vector:

identify at least one additional entity that is associated with a different hosted service; and also project feature statistics for the at least one additional entity into the vector.

69. A hosted service monitoring system, comprising: a processor;

a data storage facility; and programming instructions stored in the data storage facility, wherein the programming instructions are configured to cause the processor to:

monitor user actions that are taken on a hosted service over a period of time, wherein each of the user actions is associated with one or more features, identify an entity that comprises a subset of the user actions that share at least one of the features in common, identify a plurality of feature statistics for the entity, in which each of the feature statistics is a measurement of how often one of the features is associated with the user actions in the entity, project the feature statistics for the entity to a vector, and when or after projecting the feature statistics for the entity to the vector: identify at least one additional entity that is associated with a different hosted service, and also project feature statistics for the at least one additional entity into the vector;

use the vector to generate an anomaly score for the entity, upon generating an anomaly score that exceeds a threshold, determine that the entity is associated with an automated initiator, and upon determining that the entity is associated with an automated initiator, cause the hosted service to take an action that will block the automated initiator from accessing the hosted service.

70. The system of claim 69, wherein the programming instructions to take the action that will block the automated initiator from accessing the hosted service comprise instructions to do one or more of the following:

causing the hosted service to block attempts to access the hosted service when received by a user identifier associated with the automated initiator;

causing the hosted service to block attempts to access the hosted service when received by a user agent associated with the automated initiator;

causing the hosted service to block attempts to access the hosted service when received by an originating IP address associated with the automated initiator; or generating and outputting a report that provides identifying information for the initiator.

* * * * *